United States Patent [19]
Frazier

[11] 3,808,509
[45] Apr. 30, 1974

[54] ELECTRIC PANELBOARD COVER

[76] Inventor: John G. Frazier, 25 Pickwick Dr., Rochester, N.Y. 14618

[22] Filed: Mar. 16, 1973

[21] Appl. No.: 342,049

[52] U.S. Cl. .................. 317/120, 174/66, 220/24.3, 49/169, 292/42
[51] Int. Cl. ........................................... H02b 1/06
[58] Field of Search ...... 317/120; 174/66; 220/24.2, 220/24.3, 29, 554; 292/42, 145, 300; 49/163, 169, 171

[56] References Cited
UNITED STATES PATENTS

| | | | |
|---|---|---|---|
| 3,202,881 | 8/1965 | Carlyle | 317/120 |
| 3,618,804 | 11/1971 | Krause | 317/120 |
| 3,192,447 | 6/1965 | Kenyeres | 317/120 |
| 2,774,116 | 12/1956 | Wolverton | 49/171 |
| 1,859,974 | 5/1932 | Kroenke | 49/169 |

Primary Examiner—Robert K. Schaefer
Assistant Examiner—Gerald P. Tolin
Attorney, Agent, or Firm—Cumpston, Shaw & Stephens

[57] ABSTRACT

A cover for an electric panelboard box has a flange hinged along one vertical edge and studs on the flange for securing the cover to a vertical edge of the box. The cover has a hinged access door, and a pair of slide bolts on the inside face of the cover within reach of the access opening for latching the cover to the edge of the box opposite the flange. The access door can be used for access to circuit breakers, and by sliding the latch bars inward, the cover can be swung open for access to the wiring.

9 Claims, 4 Drawing Figures

ELECTRIC PANELBOARD COVER

THE INVENTIVE IMPROVEMENT

Electric panelboard covers ordinarily have hinged doors for access to circuit breakers or fuses, and the covers are also removable for access to the wiring. Screws and other releasable mountings have been used to support panelboard covers in place, and where the panelboard box is recessed into a wall, the cover must be adjustable relative to the box to accommodate variations between the outer edge of the box and the face of the finished wall. These problems have inspired a variety of panelboard covers which vary in expense, appearance, and convenience of mounting and dismounting.

The invention involves an analysis of all the requirements of electric panelboard covers, and an optimum design of a new panelboard cover that is simple, economical, convenient, and fully adjustable. The invention aims at minimum labor time in mounting and adjusting a panelboard cover, convenience in opening the cover for access to the wiring, invertibility for swinging the cover open in either direction, and general simplicity, economy, and attractiveness.

SUMMARY OF THE INVENTION

The inventive cover is for a box housing an electric panelboard and includes a cover plate, a flange hinged to a vertical edge of the cover plate, and studs on the flange for securing the cover plate to a vertical edge of the box within a predetermined range of proximity to the box. An access door is hinged on the cover plate over an access opening, and a slide bolt is supported by a guide within reach of the access opening on the inside face of the cover plate for latching the cover plate to the edge of the box opposite the flange. Studs on the inside face of the cover plate support the guide within a predetermined range of proximity to the cover plate, and the guide studs and flange studs provide a convenient adjustment of the proximity of the cover plate to the box.

DETAILED DESCRIPTION

Figure 3:
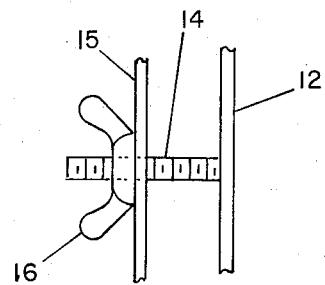
FIG. 3 is a cross-sectional view of a flange mounting stud of the cover of FIG. 1, taken along the line 3 — 3 thereof.

The inventive cover 10 includes a cover plate 11 for generally covering over the open side of an electrical panelboard box 15, and a flange 12 is secured to cover plate 11 by a hinge 13. Studs 14 on the inside face of flange 12 secure cover plate 11 to panelboard box 15. As best shown in FIG. 3, studs 14 are long enough to reach across a gap between flange 12 and box 15 and still take a nut 16 securing flange 12 to box 15. This accommodates any gaps between cover plate 11 and box 15 produced by recessing box 15 too deeply into a wall, or building a wall too far outward around box 15.

Figure 1:
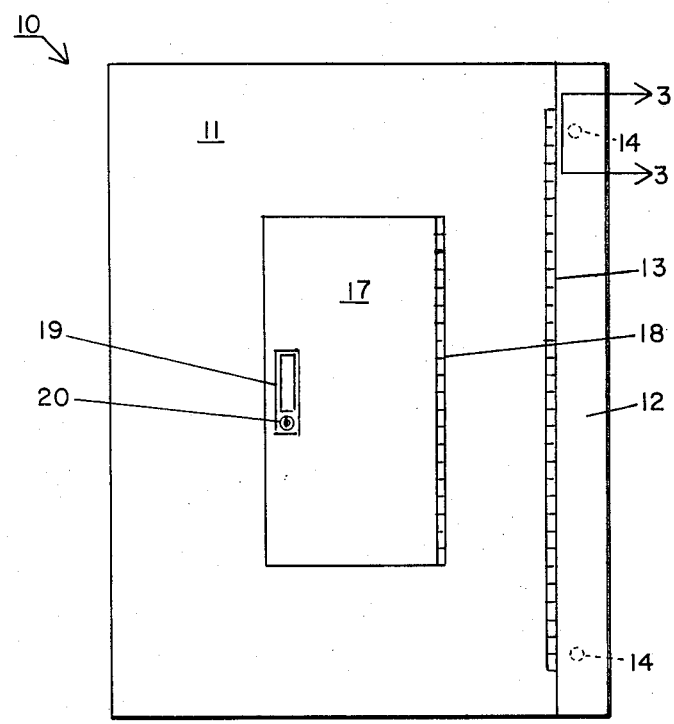
FIG. 1 is an outside elevational view of a preferred embodiment of the inventive panelboard cover.
Figure 2:
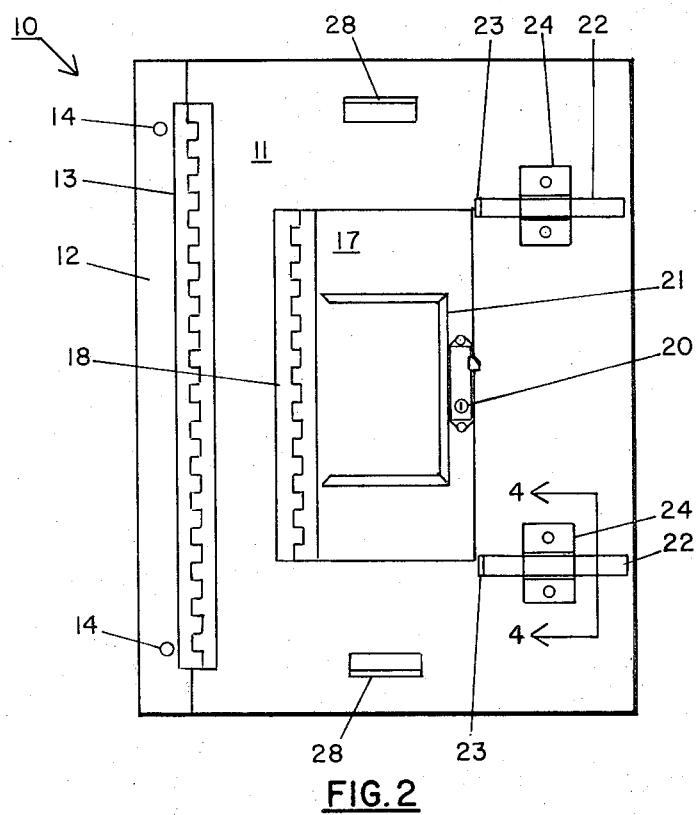
FIG. 2 is an inside elevational view of the cover of FIG. 1.

Cover plate 11 has an access door 17 supported on a hinge 18 and having a handle 19 and a lock 20 if desired. A three-sided frame 21, preferably open along a vertical edge as shown in FIG. 2, supports a circuit directory card on the inside of access door 17.

A pair of sliding surface bolts 22 are mounted on the inside face of cover plate 11 within reach of the access opening covered by door 17. Bolts 22 have handles 23 and are slidable in guides 24 which are secured on studs 25 by nuts 26. Bolts 22 can then be slid into latching engagement with the edge of box 15 opposite flange 12.

Figure 4:
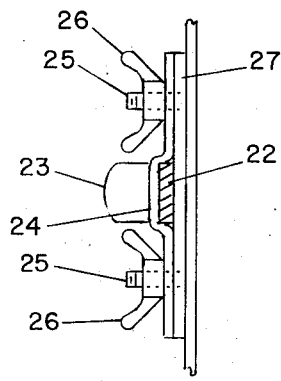
FIG. 4 is a cross-sectional view of a slide bolt and guide for the cover of FIG. 2, taken along the line 4 — 4 thereof.

To accommodate any gap required between cover plate 11 and box 15, studs 25 are long enough so that a shim 27 can be placed against the inside face of cover plate 11 under slide bolts 22 and guides 24 as best shown in FIG. 4. Shims 27 then space slide bolts 22 any desired distance away from cover plate 11 so that guide bolts 22 can latch with box 15 even though a gap may be required between cover plate 11 and box 15.

Cover plate 11 is preferably invertable so that flange 12 can be secured to either vertical edge of box 15 for hinging open cover plate 11 in either direction. A pair of support brackets 28 on the inside face of cover plate 11 are positioned to support the weight of cover plate 11 on the bottom of box 15 while nuts 16 are turned onto flange studs 14 to secure cover plate 11 in place. This eliminates the need for manually supporting cover plate 11 during installation, and one of the support brackets 28 will support cover plate 11 either end up for invertable installation to either edge of box 15.

Cover plate 11 is easily installed when positioned over the open face of box 15 with studs 14 inserted into holes in box 15 and the weight of cover plate 11 resting on box 15 through a support bracket 28. Then, by opening access door 17 and reaching into box 15, nuts 16 are turned onto studs 14 to secure flange 12 to box 15 within a predetermined range of proximity to box 15. Then if a gap is required between cover plate 11 and box 15, shims 27 of appropriate thickness are inserted under guide plates 24 and slide bolts 22 so that when cover plate 11 is fully closed, slide bolts 22 can be slid into latching engagement with the edge of box 15 opposite flange 12. Then access door 17 can be used for routine access to circuit breakers or fuses, and for access to the wiring in box 15, slide bolts 22 are unlatched and cover plate 11 is swung open on hinge 13.

The inventive cover is thus easy to install and adjust to a panelboard box, and can be unlatched and swung open in a few seconds to provide access to the wiring. It can also be securely locked shut to prevent access to the wiring.

Persons wishing to practice the invention should remember that other embodiments and variations can be adapted to particular circumstances. Even though one point of view is necessarily chosen in describing and defining the invention, this should not inhibit broader or related embodiments going beyond the semantic orientation of this application but falling within the spirit of the invention. For example, those skilled in the art will appreciate variations in slide bolts, guides, shims, mounting studs and general shapes and configurations for applying the inventive panelboard cover in a variety of circumstances.

I claim:

1. A cover for a box housing an electric panelboard, said cover comprising:
   a. a cover plate;
   b. a flange hinged to a vertical edge of said cover plate;
   c. studs on said flange securing said cover plate to a vertical edge of said box within a predetermined range of proximity to said box;
   d. an access door hinged on said cover plate over an access opening said cover plate;
   e. a slide bolt on the inside face of said cover plate latching said cover plate to the edge of said box opposite said flange;
   f. a guide supporting said slide bolt within reach of said access opening; and
   g. studs on said inside face of said cover plate supporting said guide within a predetermined range of proximity to said cover plate.

2. The cover of claim 1 including a shim spacing said guide from said cover plate.

3. The cover of claim 1 including a three-sided frame for holding a circuit directory card on the inside of said access door.

4. The cover of claim 1 including a pair of said slide bolts and guide each within reach of said access opening.

5. The cover of claim 1 including a support bracket on said inside face of said cover plate for resting said cover plate on the bottom of said box while turning nuts onto said flange studs.

6. The cover of claim 1 wherein said cover plate is invertible and mountable on either vertical edge of said box, and including a three-sided frame open along a vertical edge for holding a circuit directory card on the inside of said access door.

7. The cover of claim 6 including a pair of support brackets on said inside face of said cover plate for resting either end of said cover plate on the bottom of said box while turning nuts onto said flange studs.

8. The cover of claim 7 including a pair of said slide bolts and guides each within reach of said access opening.

9. The cover of claim 8 including shims spacing said guides from said cover plate.

* * * * *